Dec. 19, 1967     G. N. CROWTHER ETAL     3,358,550
PLASTIC RIVET WITH INTEGRAL LOCKING PIN
Filed Oct. 8, 1965     2 Sheets-Sheet 1
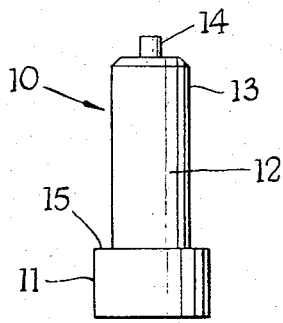
FIG.1
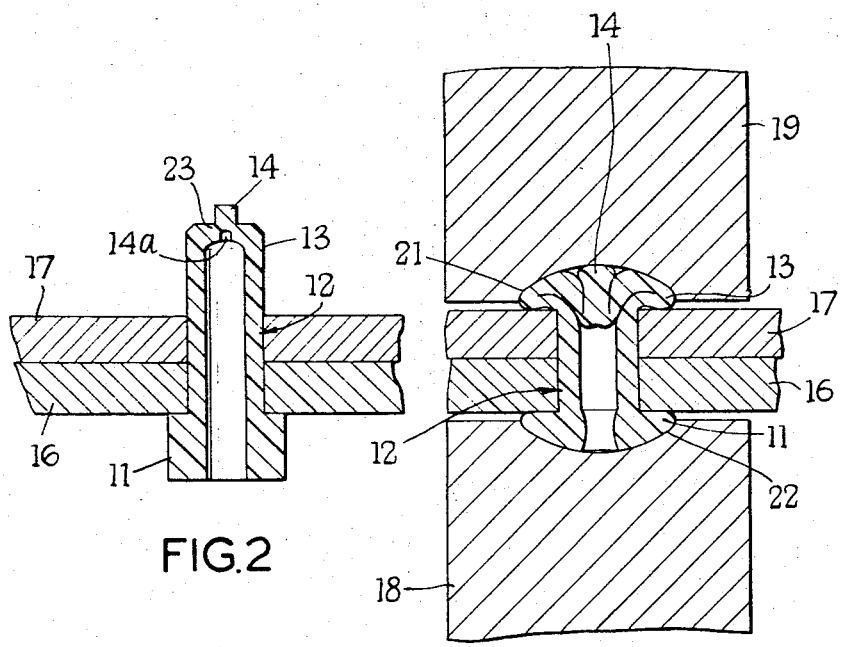
FIG.2
FIG.3
INVENTORS
George Noel Crowther
William Richard Harris
by Philip E. Parker
Attorney Dec. 19, 1967   G. N. CROWTHER ETAL   3,358,550
PLASTIC RIVET WITH INTEGRAL LOCKING PIN
Filed Oct. 8, 1965   2 Sheets-Sheet 2

INVENTORS
George Noel Crowther
William Richard Harris
by Philip E. Parker
Attorney.

United States Patent Office 3,358,550
Patented Dec. 19, 1967

3,358,550
PLASTIC RIVET WITH INTEGRAL LOCKING PIN
George Noel Crowther, Stoke Poges, and William Richard Harris, Yiewsley, England, assignors to United-Carr Incorporated, Boston, Mass., a corporation of Delaware
Filed Oct. 8, 1965, Ser. No. 494,179
Claims priority, application Great Britain, Oct. 12, 1964, 41,543/64
1 Claim. (Cl. 85—70)

ABSTRACT OF THE DISCLOSURE

A synthetic plastic rivet having a head and an integral locking pin in the tail portion. The head and tail portions are axially and radially deformed in the set position. The locking pin is forced down into the shank and the tail portion adjacent the pin is drawn down into the shank and engages the internal wall of the shank.

---

The present invention relates to an improved rivet and also to an improved method of cold rivetting employing the rivet of the invention.

It is an object of the present invention to provide a rivet of the type comprising a head, a shank and a tail portion which can be upset without applying either heat or a high compressive force and which, when upset will not creep back to its original shape allowing the fastening to become loose and subject to rattle and vibration.

It is also an object of the present invention to provide a rivet which is cheap to manufacture and which can be installed without the use of expensive equipment.

With these objects in view and in accordance with the invention there is provided a synthetic plastic rivet comprising a hollow head and a hollow shank, the end of the shank remote from the head being closed and including a tail portion, in which the tail portion is formed with an integral locking pin which projects outwardly from the tail portion and is at least approximately coaxial with the remainder of the shank.

Figures 4, 5:
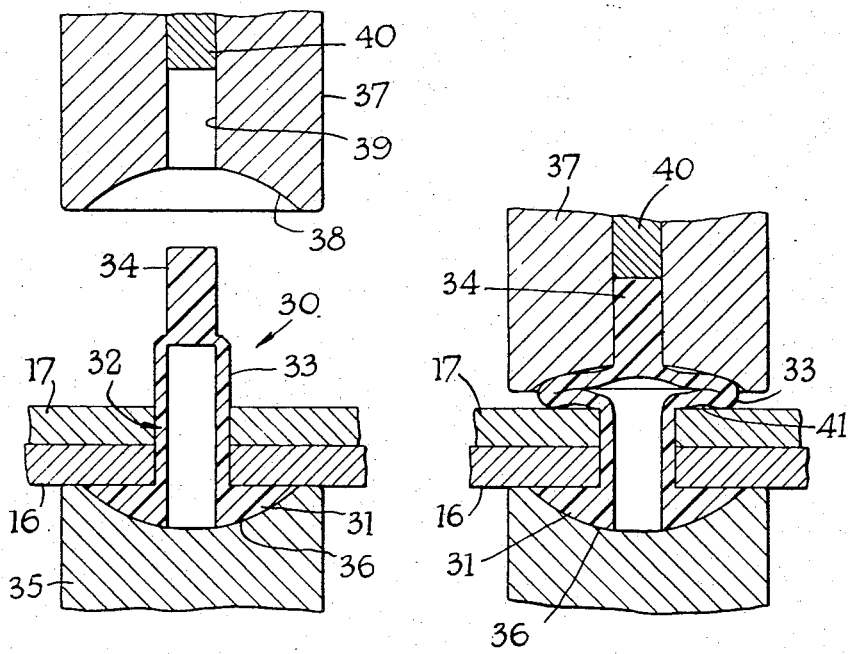
Figure 6:
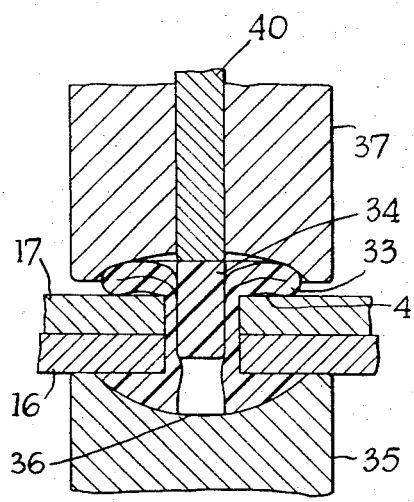
Figure 7:
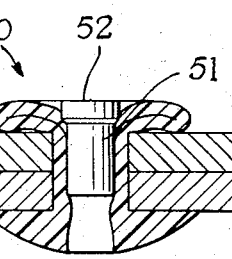

A preferred form of the invention will now be described with reference to the accompanying diagrammatic drawings in which:

FIGURE 1 is an elevation of a rivet,

FIGURE 2 is a sectional elevation showing the rivet of FIGURE 1 located through two apertured workpieces before being upset, FIGURE 3 is a sectional elevation similar to FIGURE 2 showing the rivet upset with the punch and die still in position, FIGURES 4 to 6 are sectional elevations illustrating a modification of the rivet of FIGURES 1 to 3 in the process of being upset, and FIGURE 7 is an elevation in section showing a modification of the rivet of FIGURES 4 to 6 in the upset position.

In FIGURE 1 a rivet is indicated generally at 10. The rivet 10 is formed from a synthetic plastic material, such as a polypropylene or nylon, and comprises a hollow cylindrical head 11 and a hollow cylindrical shank 12.

The end of the shank 12 remote from the head 11 is closed and defines a tail portion 13, the end of which is chamfered to provide a lead in to an apertured workpiece. A locking pin 14 is moulded integrally with the tail portion 13 of the shank so as to project therefrom co-axially with the shank and a recess 14a is formed internally in the end wall of the shank opposite the pin 14.

The cylindrical head 11 is of greater external diameter than the shank 12 so as to form an annular clamping surface 15 adjacent the shank.

The rivet 10 is used to clamp two apertured workpieces together in the manner shown in FIGURES 2 and 3.

The shank of the rivet 10 is first passed through two apertured workpieces 16 and 17 so that the clamping surface 15 on the head of the rivet butts against the outer surface of the workpiece 16. The apertures in the workpieces 16 and 17 respectively are preferably of such shape and size that the shank of the rivet is a close fit therein.

A die 18 and punch 19 which form part of a contional power-operated rivetting tool and which have part spherical forming surfaces 21 and 22 respectively are then brought to bear on the head and tail respectively of the rivet and the rivet 10 is compressed between the punch and die under sufficient pressure to deform and spread the head 11 and the tail portion 13 to the shapes shown in FIGURE 3.

As the locking pin 14 is forced downwardly by the pressure of the punch 19 the end wall portion of the tail 13 folds over and one portion thereof is drawn inwardly and downwardly around the pin 14 into the remainder of the shank 12 whilst another portion folds over and creates an external shoulder on the shank which clamps against the outer surface of the workpiece 17.

In the upset position the pin 14 is tightly locked in position and it has been found that there is little or no tendency for the material to creep back towards its original shape.

Preferably the amount of material in the tail portion 13 is such that the pin 14 and the surrounding folded over portion of the wall of the shank is forced into the remainder of the shank to a depth below the outer surface of the workpiece 17 and the outer end of the pin 14 is spread slightly, as shown in FIGURE 3. This increases the locking action and the strength of the fastening.

In the rivet 10 the pin 14 is joined to the shank 12 by sufficient material to ensure that it does not shear away from the shank as it is depressed, but this is not essential.

The head 11 of the rivet 10 may be pre-formed to or nearly to its final shape.

A modification of the rivet 10 is indicated generally at 30 in FIGURES 4 to 6.

The rivet 30 is also formed from a synthetic plastic material and comprises a hollow head 31 of part-spherical shape and a hollow cylindrical shank 32.

The end of the shank 32 remote from the head 31 is closed and forms a tail portion 33. A locking pin 34 is formed integrally with the tail portion 33 so as to project from the closed end of the shank coaxially with the shank. The external cross-sectional area of the pin 34 is slightly greater than the internal cross-sectional area of the hollow shank 32.

The rivet 30 is upset, so as to clamp the workpieces 16 and 17 together in the manner illustrated in FIGURES 4 to 6.

The shank 32, which is a close fit through the apertures in the workpieces 16 and 17 is passed through the workpieces until the head 31 seats against the outer surface of the workpiece 16 and a die 35 is then brought up beneath the head 31 of the rivet. In this position the tail portion 33 and pin 34 project from the opposite side of the workpiece 17 and the head 31 of the rivet is seated in a suitably shaped recess 36 in the die 35, as shown in FIGURE 4.

A punch 37 which has a part-spherical forming surface 38, a bore 39 shaped to receive the pin 34 of the rivet and a plunger 40 reciprocable in the bore 39, is then brought down on to the tail portion 33 of the rivet. As the punch 37 is brought down, the pin 34 enters the bore 39 so that the forming surface 38 bears against the end surface of the tail portion and collapses the tail portion which folds outwardly into the position shown in FIGURE 5. The outward folding of the wall of the tail portion 33 forms an external shoulder 41 which abuts the outer surface of the workpiece 17.

When the tail portion 33 has collapsed into the position shown in FIGURE 5 the plunger 40 is moved down the bore 39 so as to depress the pin 34. As the pin 34 is depressed the end wall of the tail portion 33 is drawn inwardly and downwardly around the pin 34 which finally breaks away from the tail portion and is jammed down as a tight friction fit into the shank 32, as shown in FIGURE 6. The die and punch are then removed and the rivet 30 remains locked in the upset position with the two workpieces 16 and 17 clamped between the head 31 and the shoulder 41 formed by the fold in the wall of the tail portion 33.

A modification of the rivet 30 is indicated generally at 50 in FIGURE 7.

The rivet 50, which is shown in its upset condition in FIGURE 7, is similar to the rivet 30 except that it has an integral locking pin 51 formed with an enlarged end portion 52. In the final upset position the enlarged portion 52 of the pin is forced into the tail portion of the rivet and spreads the tail portion further outwardly thereby increasing the resistance of the tail portion to any force tending to pull the tail portion through the workpieces.

The upsetting operation described with reference to FIGURES 2 and 3 and FIGURES 4 to 6 is preferably carried out with the synthetic plastic material in the cold state, but heat may be applied if this is convenient.

It is not essential that the shank of the rivet 10 or the rivet 30 be cylindrical in shape, for example, they may be of oval section.

It will be understood that further modifications may be made to the embodiments described above without departing from the spirit and scope of the invention which is best defined by the following claim.

What we claim is:

A synthetic plastic rivet for securing two apertured members together comprising a circumferentially continuous, hollow head and a hollow shank, the end of said shank remote from said head being closed and having a tail portion, said tail portion having an integral locking pin extending outwardly thereof in a direction opposite to and away from said head, said locking pin being at least approximately coaxial with the remainder of said shank, whereby upon passage of said shank through the apertured members and the application of compressive force to said head and said shank, said head and said tail portion are axially and radially deformed against the remote surfaces of the members and said pin is axially depressed into a portion of said shank remote from said head, the strength of the material joining said pin to said tail portion being such that the wall of said tail portion adjacent said pin is drawn down into said shank to surround said pin and engage the internal wall of said shank and jam said pin permanently in said shank thereby retaining the remainder of said tail portion in a radially deformed condition.

References Cited

UNITED STATES PATENTS

| 2,592,130 | 4/1952 | Erb et al. | |
| 2,670,021 | 2/1954 | Torresen et al. | 85—70 |
| 2,887,926 | 5/1959 | Edwards | 85—70 |
| 2,948,937 | 8/1960 | Rapata | 85—82 |
| 3,082,512 | 3/1963 | Scheldorf | 85—70 |
| 3,089,377 | 5/1963 | Engstrom | 85—72 |

FOREIGN PATENTS

| 127,529 | 5/1958 | Australia. |
| 944,090 | 6/1956 | Germany. |
| 647,380 | 12/1950 | Great Britain. |
| 727,942 | 4/1955 | Great Britain. |

MARION PARSONS JR., *Primary Examiner.*

CARL W. TOMLIN, *Examiner.*